(12) United States Patent
Everette et al.

(10) Patent No.: US 10,303,326 B2
(45) Date of Patent: May 28, 2019

(54) ELECTRONIC SYSTEM WITH CONTINUOUS NAVIGATION MECHANISM AND METHOD OF OPERATION THEREOF

(71) Applicant: Samsung Electronics Co., Ltd., Suwon-si, Gyeonggi-do (KR)

(72) Inventors: Neil Everette, San Jose, CA (US); Cheryl Sedota, Mount Pleasant, SC (US); Maverick Velasco, Morgan Hill, CA (US); Rachel Kobetz, San Jose, CA (US); Paul Dixon, Redwood City, CA (US); Syyean Hwu Gastelum, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 14/292,805

(22) Filed: May 30, 2014

(65) Prior Publication Data

US 2015/0067606 A1    Mar. 5, 2015

Related U.S. Application Data

(60) Provisional application No. 61/939,589, filed on Feb. 13, 2014, provisional application No. 61/871,764, filed on Aug. 29, 2013.

(51) Int. Cl.
*G06F 3/0488* (2013.01)
*G06F 3/0482* (2013.01)
*G06F 3/0484* (2013.01)

(52) U.S. Cl.
CPC ........ *G06F 3/0482* (2013.01); *G06F 3/04842* (2013.01); *G06F 3/04883* (2013.01)

(58) Field of Classification Search
CPC ........ G06F 3/017; G06F 3/0488; G06F 3/042; H04N 21/431; H04N 21/4312
See application file for complete search history.

(56) References Cited

U.S. PATENT DOCUMENTS

| | | | |
|---|---|---|---|
| 6,476,831 B1 | 11/2002 | Wirth et al. | |
| 8,902,165 B1 * | 12/2014 | Pflughaupt | G06F 3/03549 345/156 |
| 2007/0236475 A1 | 10/2007 | Wherry | |
| 2009/0070363 A1 * | 3/2009 | Bull | G11B 27/34 |
| 2010/0156818 A1 | 6/2010 | Burrough et al. | |
| 2010/0229094 A1 * | 9/2010 | Nakajima | G10H 1/0008 715/727 |
| 2012/0229400 A1 * | 9/2012 | Birnbaum | G06F 3/016 345/173 |
| 2013/0178962 A1 * | 7/2013 | DiMaria | G06F 17/30038 700/94 |

OTHER PUBLICATIONS

When an intermediate view matters a 2D—browser experiment, University of Maryland, Oct. 1992.

* cited by examiner

*Primary Examiner* — Rinna Yi

(57) ABSTRACT

An electronic system includes: a control unit configured to generate a graphical navigation interface including a marker in a loop configuration, detect a touch gesture on the marker; and a user interface, coupled to the control unit, configured to present identifying information associated with the touch gesture.

21 Claims, 10 Drawing Sheets

| POP | DANCE | 60S |
|---|---|---|
| ART1 | ART1 | |
| ART2 | ART2 | |
| ART3 | | |
| | ART4 | |
| ART5 | | ART5 |
| | | ART6 |
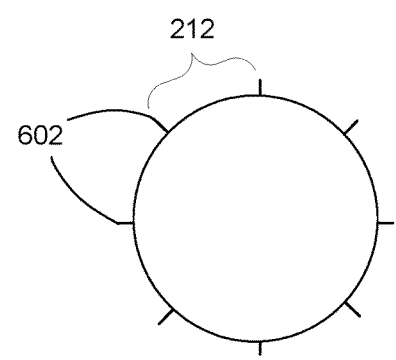
| | POP | DANCE | 60S |
|---|---|---|---|
| POP | X | 0 | 1 |
| DANCE | 0 | X | 2 |
| 60S | 1 | 2 | X |
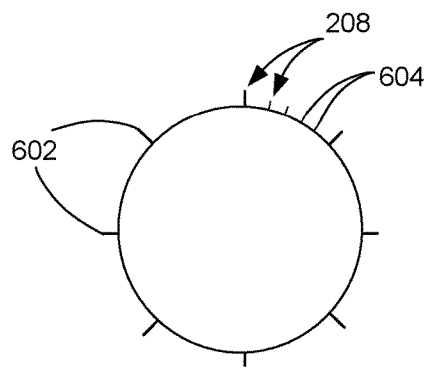
FIG. 6

ELECTRONIC SYSTEM WITH CONTINUOUS NAVIGATION MECHANISM AND METHOD OF OPERATION THEREOF

CROSS-REFERENCE TO RELATED APPLICATION(S)

This application claims the benefit of U.S. Provisional Patent Application Ser. No. 61/871,764 filed Aug. 29, 2013, and the subject matter thereof is incorporated herein by reference thereto. This application claims the benefit of U.S. Provisional Patent Application Ser. No. 61/939,589 filed Feb. 13, 2014, and the subject matter thereof is incorporated herein by reference thereto. This application claims the benefit of U.S. Provisional Patent Application Ser. No. 61/813,116 filed Apr. 17, 2013, and the subject matter thereof is incorporated herein by reference thereto.

TECHNICAL FIELD

An embodiment of the present invention relates generally to an electronic system, and more particularly to a system for continuous navigation.

BACKGROUND

Modern consumer and industrial electronics, such as televisions, projectors, cellular phones, smartphones, appliances, and combination devices, are providing increasing levels of functionality to support modern life. Research and development in the existing technologies can take a myriad of different directions.

Electronic systems provide more functionality in an ever decreasing form factor. This represents challenges of accessing more information and content on a smaller device.

Thus, a need still remains for an electronic system with continuous navigation mechanism to navigate through the various content and information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system, including: a control unit configured to: generate a graphical navigation interface including a marker in a loop configuration, detect a touch gesture on the marker; and a user interface, coupled to the control unit, configured to present identifying information associated with the touch gesture.

An embodiment of the present invention provides a method of operation of an electronic system including: generating with a control unit a graphical navigation interface including a marker in a loop configuration; detecting a touch gesture on the marker; and presenting identifying information associated with the touch gesture.

An embodiment of the present invention provides a graphical user interface to navigate a hierarchy of content on an electronic system including: markers separated by a region with the markers and region in a loop configuration.

An embodiment of the present invention provides non-transitory computer readable medium including instructions for execution, the medium including: generating with a control unit a graphical navigation interface including a marker in a loop configuration; detecting a touch gesture on the marker; and presenting identifying information associated with the touch gesture.

Certain embodiments of the invention include other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 6 is an example to implement the graphical navigation interface.

DETAILED DESCRIPTION

Figure 1:
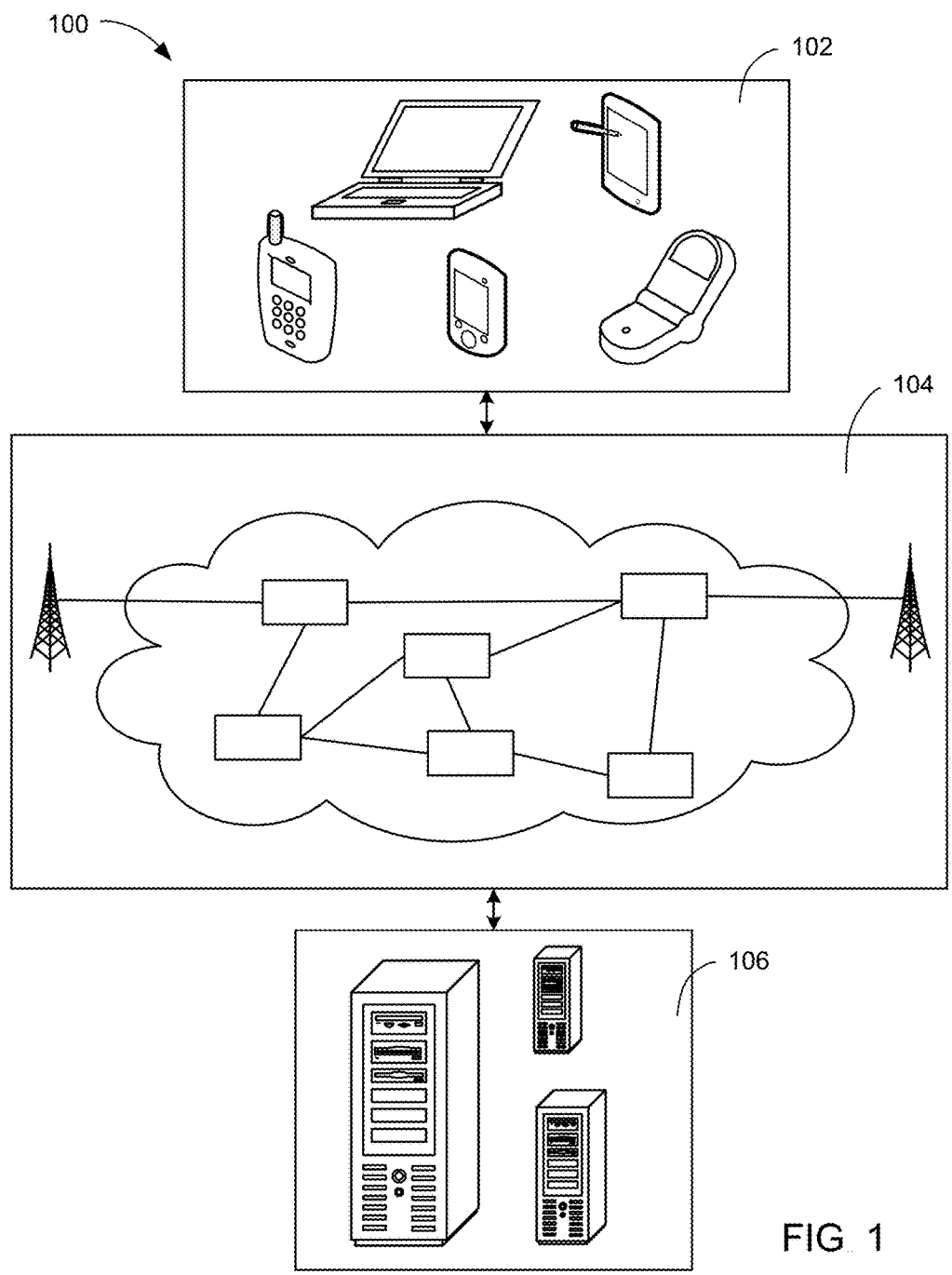
FIG. 1 is an electronic system with continuous navigation mechanism in an embodiment of the present invention.

An embodiment of the present invention provides a graphical navigation interface for interacting user interface elements in an application design for a phone, tablet, computer, notebook, television, or home appliance. The building blocks of user interface structure include of either list or grids structures offering a consistent and predictable pattern to locate a given item in a list array. An example is an address book, where a list is used to store an array of contact names in A-Z order. The lists can also include multiple levels of organization or multiple hierarchies. In the example of the address book, there can be one level of the list elements; all the names in A-Z order. Other lists can be structured in categories, such as for music. Any given song can be structured within an album or artist, then within a given genre, as an example. The graphical navigation interface addresses both the multi-level structure of nested lists as well as provides an easier way to traverse a long list of elements in an array.

An embodiment of the present invention provides a user interface control on a touch screen device that enables the user to use one continuous gesture to navigate a long list of items, and to navigate to sub levels of a hierarchy with the same gesture. The term continuous refers to one continuous contact before the contact is released.

An embodiment of the present invention provides a looped or circular user interface that will navigate or zoom down to the second level or lower level list when the user scrolls slower in the list and move up in the hierarchy to the parent list when the user scrolls faster in the list.

An embodiment of the present invention provides a small thumbnail of artwork or an identifying information for visual recognition and vibration for haptic feedback to indicate the position in the list along with an audio/media sampled at the rate of the velocity or movement of the finger on the user interface control.

An embodiment of the present invention provides a looped or circular user interface that is displayed, whereby the user traces the finger along the arc in a continuous motion to move up and down an array of list items. The list will move in the direction of the user's gesture—clockwise to move down the list, counterclockwise to move up the list or reverse view of current hierarchy. As the items in the list move up an audio sample is played to indicate position in the list, along with a small thumbnail of artwork, e.g. the identifying information, for visual recognition and vibration for haptic feedback. The sample rate of the audio clip is based on the velocity or movement of the finger on the user interface control. When the user scrolls slower in the list, the list will navigate or zoom down to the second level list. Once in a second level list, scrolling fast again will move up in the hierarchy to the parent list, as an example. The movement or zooming from one list level to another is indicated by a visual cue.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with continuous navigation mechanism in an embodiment of the present invention. The electronic system 100 includes a first device 102, such as a client or a server, connected to a second device 106, such as a client or server.

The first device 102 can communicate with the second device 106 with a communication path 104, such as a wireless or wired network.

For example, the first device 102 can be of any of a variety of display devices, such as a cellular phone, smartphone, personal digital assistant, a notebook computer, a computer tablet, a house-hold appliance, or a multi-functional device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can include a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
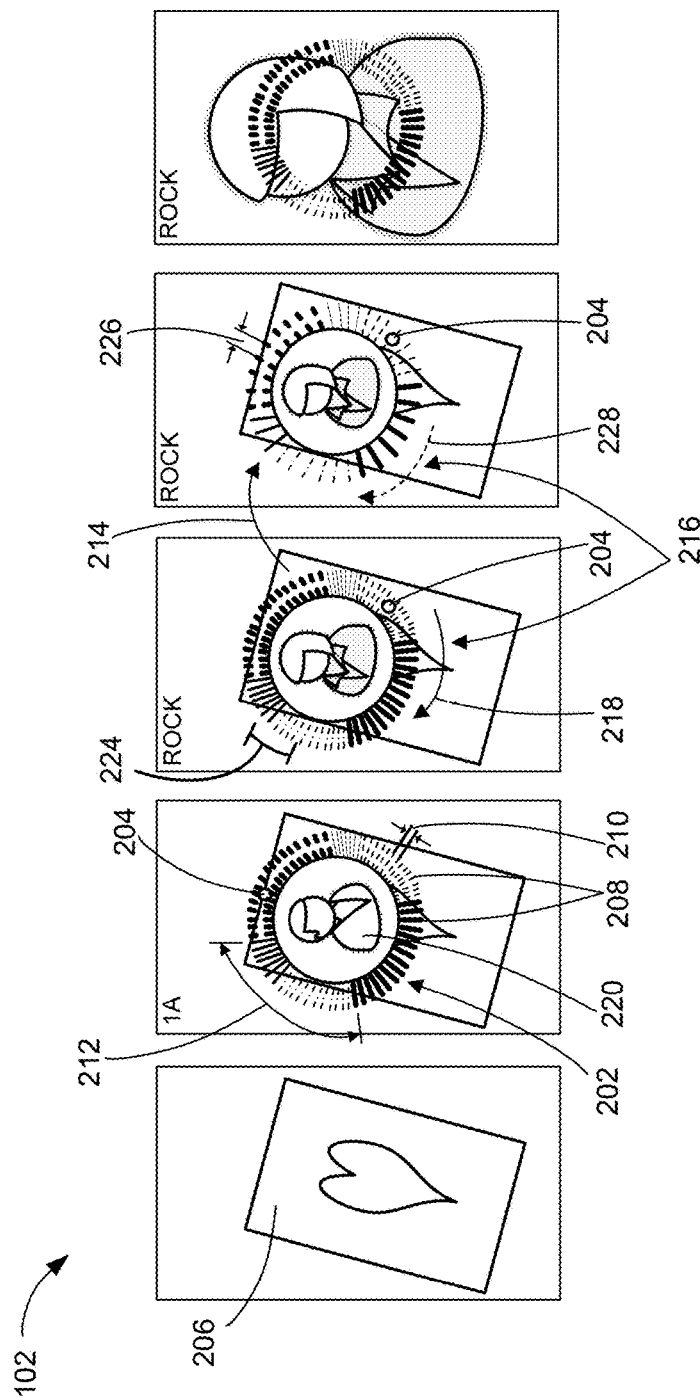
FIG. 2 is examples of displays of the electronic system utilizing a graphical navigation interface.

Referring now to FIG. 2, therein are shown examples of displays of the electronic system 100 utilizing a graphical navigation interface 202. These displays depict examples of the graphical user interface including the graphical navigation interface 202.

The leftmost display is an example display on the first device 102 of FIG. 1 where the graphical navigation interface 202 will be displayed. The leftmost display depicts a background 206. The background 206 is an image, text, video, sounds, or a combination thereof. The second leftmost display depicts the graphical navigation interface 202 is used to traverse content, information, an application, or a combination thereof through touch and speed of a touch gesture 204 along the graphical navigation interface 202. In one embodiment, the touch gesture 204 operates on the graphical navigation interface 202 with the use of only one single finger on the graphical navigation interface 202. The touch gesture 204 will be described in more detail later.

For illustrative purposes, the embodiment of the present invention is described with the graphical navigation interface 202 operating on the first device 102, although it is understood that the electronic system 100 can operate differently. For example the graphical navigation interface 202 can operate on the second device 106 of FIG. 1 or both on the first device 102 and the second device 106. As a further example, the graphical navigation interface 202 can be used on the first device 102 to control the second device 106 or vice versa or both. As yet a further example, the graphical navigation interface 202 on the first device 102 can interface with the graphical navigation interface 202 on the second device 106. The graphical navigation interface 202 on the first device 102 and on the second device 106 can be the same or different. The graphical navigation interface 202 on the first device 102 and on the second device 106 can include functional coupling with each other or operate separately and independently from each other.

Returning to the description for the second leftmost display, as an example, on first device 102. The second leftmost display depicts the graphical navigation interface 202 as the image "in front" of the background 206. The background 206 can be related to the content or information or application to which the graphical navigation interface 202 can be used to traverse, control, or interact with. The background 206 can also be a static image not relating to functionality of the graphical navigation interface 202 with respect to the content or information or application.

As depicted in the second leftmost display, the graphical navigation interface 202 is shown with markers 208 arranged for a continuous flow where the markers 208 are placed in the loop configuration. As an example, the graphical navigation interface 202 is shown in a circular loop configuration. The graphical navigation interface 202 can also be arranged in a different configuration. For example, the graphical navigation interface 202 can be shown in a geometric configuration as an ellipse, a square, a rectangle, a triangle, a trapezoid, a parallelogram, or other closed perimeter geometric configuration.

As an example, the graphical navigation interface 202 includes the markers 208 that are evenly distributed with a first spacing 210 between one of the markers 208 to the adjacent instances of the markers 208. The first spacing 210 is a gap between the markers 208. The first spacing 210 can be different between the markers 208.

The graphical navigation interface 202 also depicts regions 212. The markers 208 within one of the regions 212 can be depicted differently from the markers 208 within a different instance of the regions 212. The markers 208 can be depicted differently between the regions 212 in a number of ways. For example, the markers 208 between the regions 212 or at least the adjacent instances of the regions 212 can be depicted with different colors, thickness of lines, different geometric configurations, different animations, different sizes, different haptic feedback, different auditory feedback, or a combination thereof. As an example, the markers 208 between the different regions 212 are depicted differently in this figure by dashed pattern, line weights, or a combination thereof.

Each of the regions 212 represents a different content, information, classification, application, or a combination thereof in a hierarchy 214 relative to the adjacent one associated with the graphical navigation interface 202. The hierarchy 214 refers to a structure or organization of information or content. The regions 212 can provide different functionality and meaning depending on the current state of the first device 102. The current state refers to the present state of the first device 102 or the current application running on the first device 102.

The second leftmost figure also depicts the touch gesture 204 stationary on the graphical navigation interface 202, although for description the touch gesture 204 is not stationary in the figure but moving along the graphical navigation interface 202 with a gesture speed 216. The gesture speed 216 is the rate in which the touch gesture 204 moves along the graphical navigation interface 202. In this example, the gesture speed 216 is at a scanning speed 218. The scanning speed 218 is at a speed where the graphical navigation interface 202 does not change and the markers 208 do not change while the touch gesture 204 is traversing the graphical navigation interface 202 with the scanning speed 218. The first spacing 210 of the markers 208 does not change with the touch gesture 204 moving along at the scanning speed 218 although the depiction can change, as noted before.

In this example, the background 206 has changed to reflect the location of the touch gesture 204 along the graphical navigation interface 202 as well as the particular instances of the markers 208 invoking a particular content, information, or application. The background 206 can display information about the song name, artist, album name, or genre in the upper right hand portion of the background 206.

The background 206 can also change to depict an identifying information 220 within the perimeter of the graphical navigation interface 202 where the identifying information 220 relates to or associated with the specific instance of the markers 208 where the touch gesture 204 is currently positioned. The identifying information 220 can be represented in a number of ways. For example, the identifying information 220 can be an image, a video, text, or a combination thereof.

The depiction or representation of the markers 208 can be different with the touch gesture 204 than without the touch gesture 204. In other words, the colors, thickness of lines, geometric configurations, animations, sizes, haptic feedback, auditory feedback, or a combination thereof can different to those of the leftmost figure without the touch gesture 204.

Now referring to the middle figure or the third leftmost figure, this figure depicts the touch gesture 204 at a different location than in the previous figure. At this location, the touch gesture 204 is in a different instance of the regions 212 and on a different instance of the markers 208. As such, the background 206 is different in this figure than in the previous figure.

The background 206 depicts different information at the upper left hand corner to reflect the information related to the specific instance of the markers 208 where the touch gesture 204 is located. In an example of music player, the information can be the same type of information shown as in the previous figure, including the identifying information 220.

Transitioning from the middle figure to the second to the last rightmost figure, the transition can occur if the gesture speed 216 falls outside a hierarchy range 224. The transition depicts a traversal operation long the hierarchy 214 of information or content.

The hierarchy range 224 provides values to determine if the current value for the gesture speed 216 falls below a lower value of the hierarchy range 224, then that change in value in the gesture speed 216 should invoke a different action than just traversing the touch gesture 204 along the graphical navigation interface 202. As an example, transition to obtain more details about the markers 208 or the regions 212 in which the touch gesture 204 is located. In other words, the graphical navigation interface 202 can traverse the hierarchy 214 of information or content based on the location of the touch gesture 204 on the markers 208 when the gesture speed 216 falls outside of the hierarchy range 224.

The hierarchy range 224 can also provide a similar function with a higher value but can be used to determine if the gesture speed 216 goes outside the values determined by the hierarchy range 224 even if the gesture speed 216 goes faster than the high value of the hierarchy range 224 as well as below the low value for the hierarchy range 224. When the gesture speed 216 goes outside of the hierarchy range 224, then this can invoke a different action than just traversing the touch gesture 204 along the graphical navigation interface 202. As an example, the graphical navigation interface 202 can be traversed to invoke a higher level content, information, or category than the present level being displayed with the graphical navigation interface 202.

The values for the hierarchy range 224 can vary depending on the current state of the electronic system 100, such as what application is running, the type of content or information, the type of interaction, the level of hierarchy of the information, or a combination thereof. The low value and the high value of the hierarchy range 224 can function independently of each other. Further, if the present level of the graphical navigation interface 202 is at the most detailed or lowest level, then the low value of the graphical navigation interface 202 can be ignored or not set to a value or to a zero value. Similarly, if the present level of the graphical navigation interface 202 is at the highest or broadest level, then the high value of the hierarchy range 224 can be ignored or not set to a value or set to a maximum value.

In this second rightmost figure, the markers 208 are spaced in a second spacing 226. This transition can occur when the gesture speed 216 falls below the low value of the hierarchy range 224 to cause a more detailed view of the content or information related to the instance of the markers 208 where gesture speed 216 was determined to go from the scanning speed 218 to a delta speed 228. The delta speed 228 is the speed value of the gesture speed 216 where the touch gesture 204 invoked a different action than simply displaying the content or information or the application related to the markers 208 while the gesture speed 216 was at the scanning speed 218. In this example, the action invoked is to zoom in or view additional details related to the instance of the markers 208 where the change was detected when the gesture speed 216 changed from the scanning speed 218 to the delta speed 228.

The second spacing 226 is the gap between the markers 208 in the zoomed-in view in this example. The second spacing 226 is depicted as a larger gap than the first spacing 210, although it is possible that the second spacing 226 can be the same gap size as the first spacing 210 or even a smaller gap size than the first spacing 210 depending on the number of instances for the markers 208 in this view.

Continuing with this example, the graphical navigation interface 202 is depicted with only one instance of the regions 212 implying that the content in this view is the same type regardless of the instance of the markers 208 the touch gesture 204 traverses over. While in this view, as the touch gesture 204 moves along the graphical navigation interface 202, a selection can be made with the markers 208 visible in this current view.

Now referring to the rightmost figure, the transition from the previous figure to this one can be invoked by releasing the touch gesture 204 from the location on the graphical navigation interface 202. This release action functions as a selection of the content or information or application related to the specific instance of the markers 208 where the touch gesture 204 was released or terminated.

In this example, the identifying information 220 that was previously depicted within the perimeter of the graphical navigation interface 202 depicted in the middle figure and the second to last figure is now used for the background 206. This change can indicate the selection made with the touch gesture 204 with the graphical navigation interface 202.

This figure depicts, as an example, that the graphical navigation interface 202 reverts back to the version depicted in the leftmost figure with the regions 212 and the markers 208 separated by the first spacing 210. In this example, the graphical navigation interface 202 returns to the same level or state as in the leftmost figure allowing a selection similar to a starting point as the second leftmost figure without the invocation with the touch gesture 204.

Figure 3:
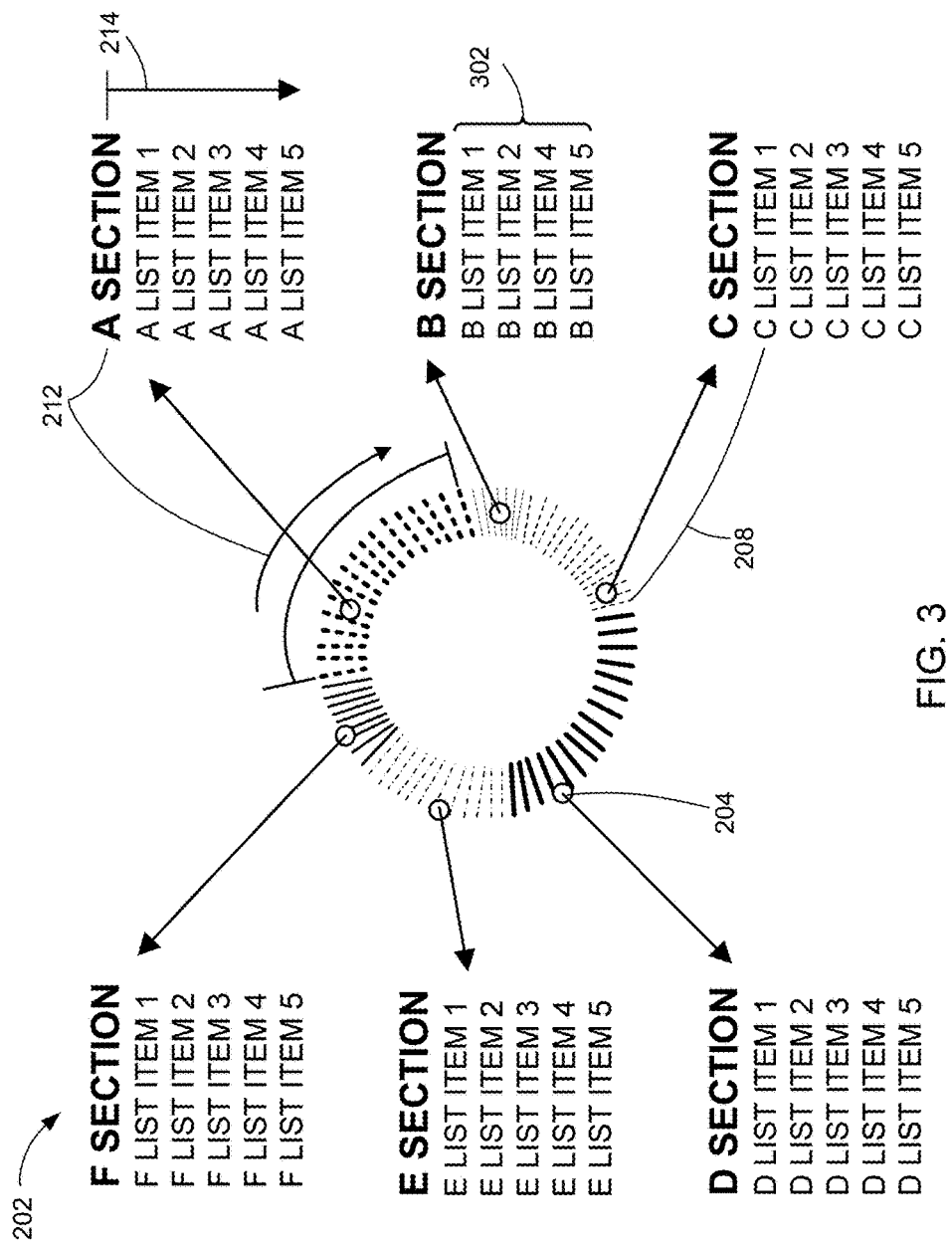
FIG. 3 is an example detailed view of the graphical navigation interface.

Referring now to FIG. 3, therein is shown an example detailed view of the graphical navigation interface 202. FIG. 3 can depicts the graphical navigation interface 202 as in the example in the leftmost figure in FIG. 2.

As in FIG. 2, FIG. 3 depicts the graphical navigation interface 202 including the regions 212 and the markers 208. As described in FIG. 2, the markers 208 are depicted differently between one of the regions 212 to another and the same within the same instance of the regions 212.

FIG. 3 depicts an example of additional details for each of the regions 212 and the hierarchy 214 of information or content. In this example, the top-most portion of the hierarchy 214 can correspond to one of the regions 212 representing a particular type or classification of content or information or application. Each of the regions 212 can provide additional content or information as a sub-level 302 or next level of the hierarchy 214 relating to the particular instance of the regions 212.

The additional details for each of the regions 212 can be organized or configured in a number of ways. For example, each of the regions 212 can include the sub-level 302 organized in a list or a tree structure. A list structure is depicted in FIG. 3.

For illustrative purposes and for brevity, each of the regions 212 is depicted with only one level or hierarchy with the sub-level 302, although it is understood that the graphical navigation interface 202 can be organized differently. For example, each of the regions 212 can include differing number of elements within its respective instance of the sub-level 302. Also, the sub-level 302 can include further details with additional hierarchies or levels below or extending from the sub-level 302. Each of the regions 212 can include different structures for the sub-level 302 depending on the content, information, type, classification, or a combination thereof for each of the regions 212 and the sub-level 302.

Further for illustrative purposes, FIG. 3 depicts the list for each of the regions 212 and the markers 208 and the information for the sub-level 302, although it is understood that the list information is not displayed on the background 206 as a list or grid on the background 206 as shown in FIG. 3. As described in FIG. 2, certain information is provided on the background 206 based on the location of the touch gesture 204.

Figure 4:
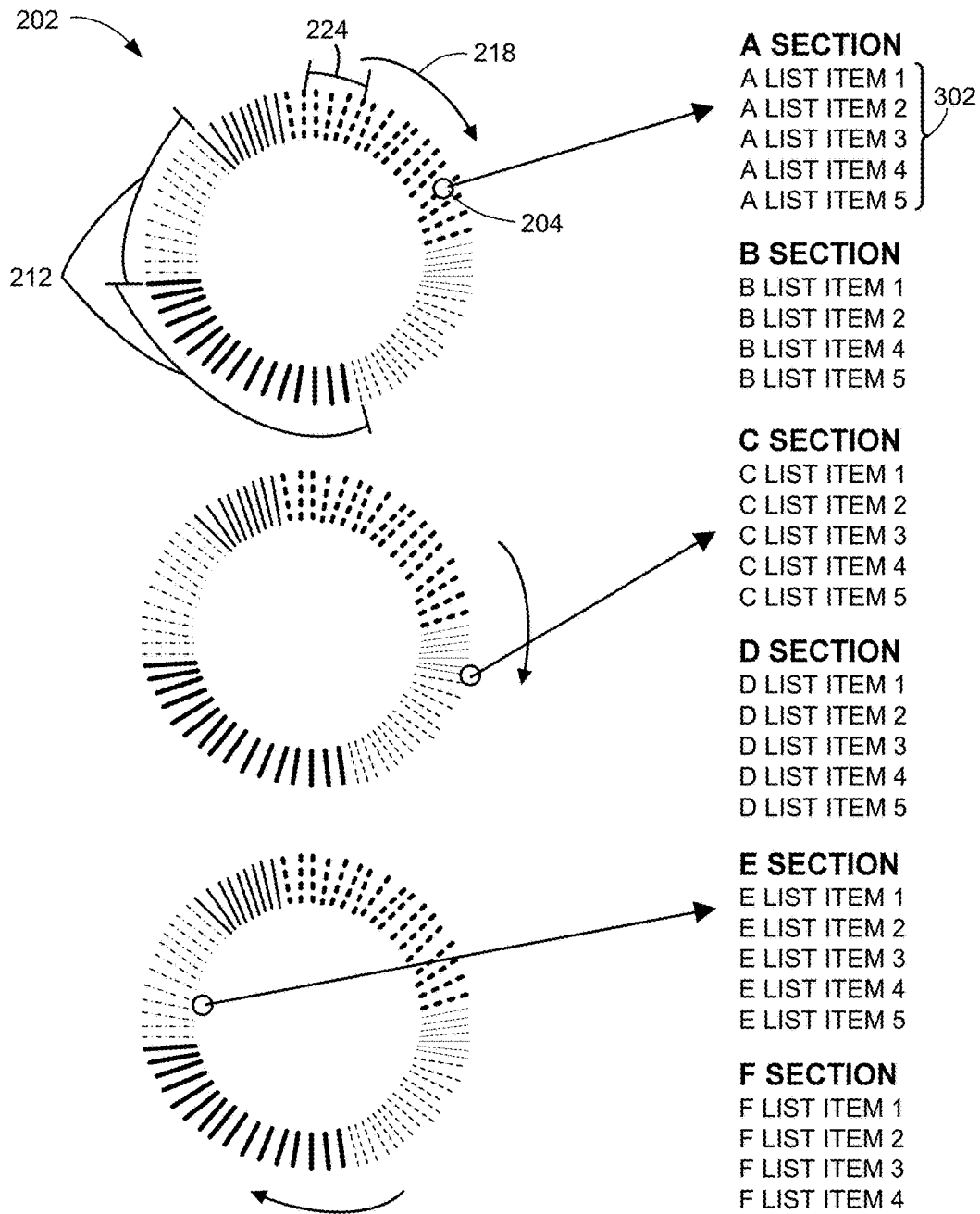
FIG. 4 is an example operation of the graphical navigation interface along a single hierarchy.

Referring now to FIG. 4, therein is shown an example operation of the graphical navigation interface 202 along a single hierarchy. FIG. 4 can depict an example of the operation as described in FIG. 2 with the touch gesture 204 at the second leftmost figure in FIG. 2.

FIG. 4 depicts the action invoked by the touch gesture 204 traversing around the graphical navigation interface 202 and over different instances of the regions 212. FIG. 4 depicts the touch gesture 204 traversing the graphical navigation interface 202 at the scanning speed 218 without falling outside the hierarchy range 224. The regions 212 represent the various content or information described in FIG. 3.

In this example, the top figure represents the location of the touch gesture 204 on a particular instance of the regions 212 and is related to specific content and specific information for the sub-level 302. Some information about each of these regions 212, the sub-level 302, or a combination thereof can be displayed as described in FIG. 2. The other two figures depict the change of position for the touch gesture 204 over different instances of the regions 212 representing and relating to different content or information or application with the sub-level 302 associated with each of the regions 212.

Figure 5:
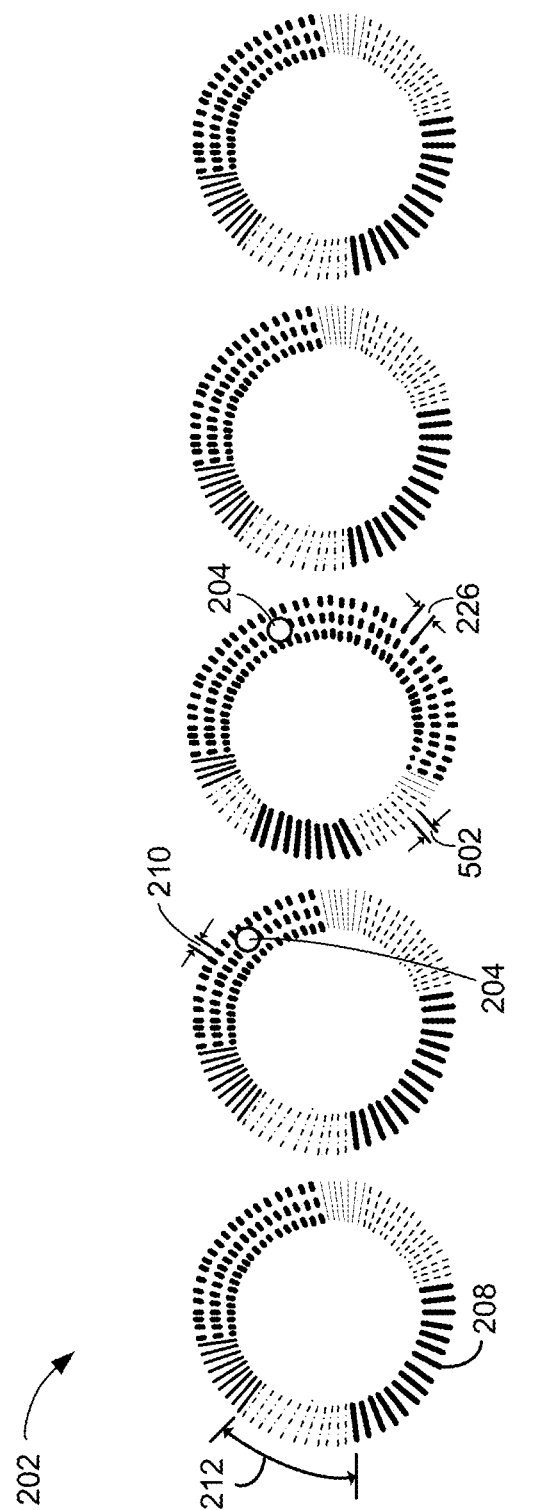
FIG. 5 is an example operation of the graphical navigation interface traversing different hierarchies.

Referring now to FIG. 5, therein is shown an example operation of the graphical navigation interface 202 traversing different hierarchies. FIG. 5 is similar to the description in FIG. 2. The middle figure in FIG. 5 provides a variation of the graphical navigation interface 202 where the speed of movement for the touch gesture 204 falls below the low value of the hierarchy range 224 of FIG. 2, then the instance of the regions 212 where a change trigger is detected, the markers 208 can be increased to the second spacing 226 to allow fine grain control to select the content or information or controls for that particular instance of the regions 212.

In addition, for example, the other instances of the regions 212 in the graphical navigation interface 202 can be spaced to a third spacing 502, which provides a different gap between the markers 208 to accommodate the expanding gap size of the second spacing 226. This implies that the third spacing 502 has a gap size less than the first spacing 210.

Also shown in this example, the second rightmost figure depicts the transition of the graphical navigation interface 202 from the zoom mode or in the sub-level 302 back to a higher level by increasing the rate in which the touch gesture 204 traverses over the graphical navigation interface 202. If the speed of the touch gesture 204 exceeds a high value of the hierarchy range 224, then the graphical navigation interface 202 will transition from the current view of the sub-level 302 to the next highest level.

Referring now to FIG. 6, therein is shown an example to implement the graphical navigation interface 202. The graphical navigation interface 202 is shown with the regions 212 and the markers 208. The markers 208 can include a region marker 602 and a sub-level marker 604. The top example depicts each of the regions 212 separated by the region marker 602 providing a coarse level of display for the regions 212 and for ease of viewing. The lower example depicts a plurality of the sub-level marker 604 can be between adjacent instances of the region marker 602 providing finer level of display, finer control, or a combination thereof.

The region marker 602 represents a beginning of one of the regions 212 and also indicates the end of the previous one. The sub-level marker 604 relates to the content, information, or application within that particular instance of the regions 212 and for that hierarchy of the sub-level 302 of FIG. 3.

For illustrative purposes, the graphical navigation interface 202 is depicted with the markers 208 visually depicting both the region marker 602 and the sub-level marker 604, although it is understood that the graphical navigation interface 202 can be configured differently. For example, the graphical navigation interface 202 can visually depict only the region marker 602 for each of the regions 212 and not visually depict the sub-level marker 604 for the content, information, or application for each of the sub-level 302. This variation allows for a visual depiction to focus on the broader topics and content. If the touch gesture 204 of FIG. 2 triggers a crossing with the hierarchy range 224, then the sub-level marker 604 can be shown for each content or information in the sub-level 302.

The example depicted in this figure is for a music player application. The upper left hand corner depicts example of different music genre, e.g. Pop, Dance, 60's, and these can be markers 208 or as a more specific example each of the genre can be one of the regions 212 demarked by the region marker 602. The table also depicts a number of artists within each genre where an artist can appear in multiple genres. The list of artists can be the sub-level 302 for each of the regions 212.

In this figure, a matrix is shown below the table associated with the graphical navigation interface 202 mapping the commonalities from the sub-level 302, e.g. artist, from each of the regions 212, e.g. genre, to the other instances of the regions 212. The numeric count can be used as Cartesian values to place the region marker 602 for one of the regions 212 relative to the other instances of the regions 212 along the graphical navigation interface 202. The numeric values in the matrix represent the similarities of items or artists between the genres.

FIG. 6 also depicts the graphical navigation interface 202 as an example structural relationship between the regions 212, the markers 208, and the sub-level 302. The structural relationship of the regions 212 and the region marker 602 are depicted as one level of hierarchy. The sub-level 302 and the sub-level marker 604 are depicted in a lower level hierarchy relative to the region marker 602. The relative order of the region marker 602 for one genre to the adjacent one can be determined by the similarities or distance in the matrix example. The structural relationship of the graphical navigation interface 202 can be implemented as a software structure, a database structure, or as a state machine and state transitions in hardware.

As further example, an embodiment can automatically group either similar regions 212, as in a music player example tracks, (to provide drill-down) or a different sub-level 302, e.g. tracks (to provide contrast while circling through the channels), via separating into progressively smaller groups based on statistical clustering (e.g., K-means) on metadata (possibly generated from the content directly, possibly genre and the like, or from user or item-based clustering like for collaborative filtering). The first pass generates the regions 212 as very broad categories, statistical, but at the same level of generality as broad genres, like "classical", "rock", "jazz". The next pass might go into the sub-level 302 as sub-genres, then sub-sub-genres, etc. So the hierarchy is implicit because each sub-cluster subsumes its children.

Once we have the hierarchies, the hierarchy 214 of FIG. 2, automatically created, then the graphical navigation interface 202 can be operated in a round-robin manner through the high-level clusters, as an example the regions 212, to provide aural differentiation, or else just use the hierarchies directly to do drill-down to the sub-level 302.

Figure 7:
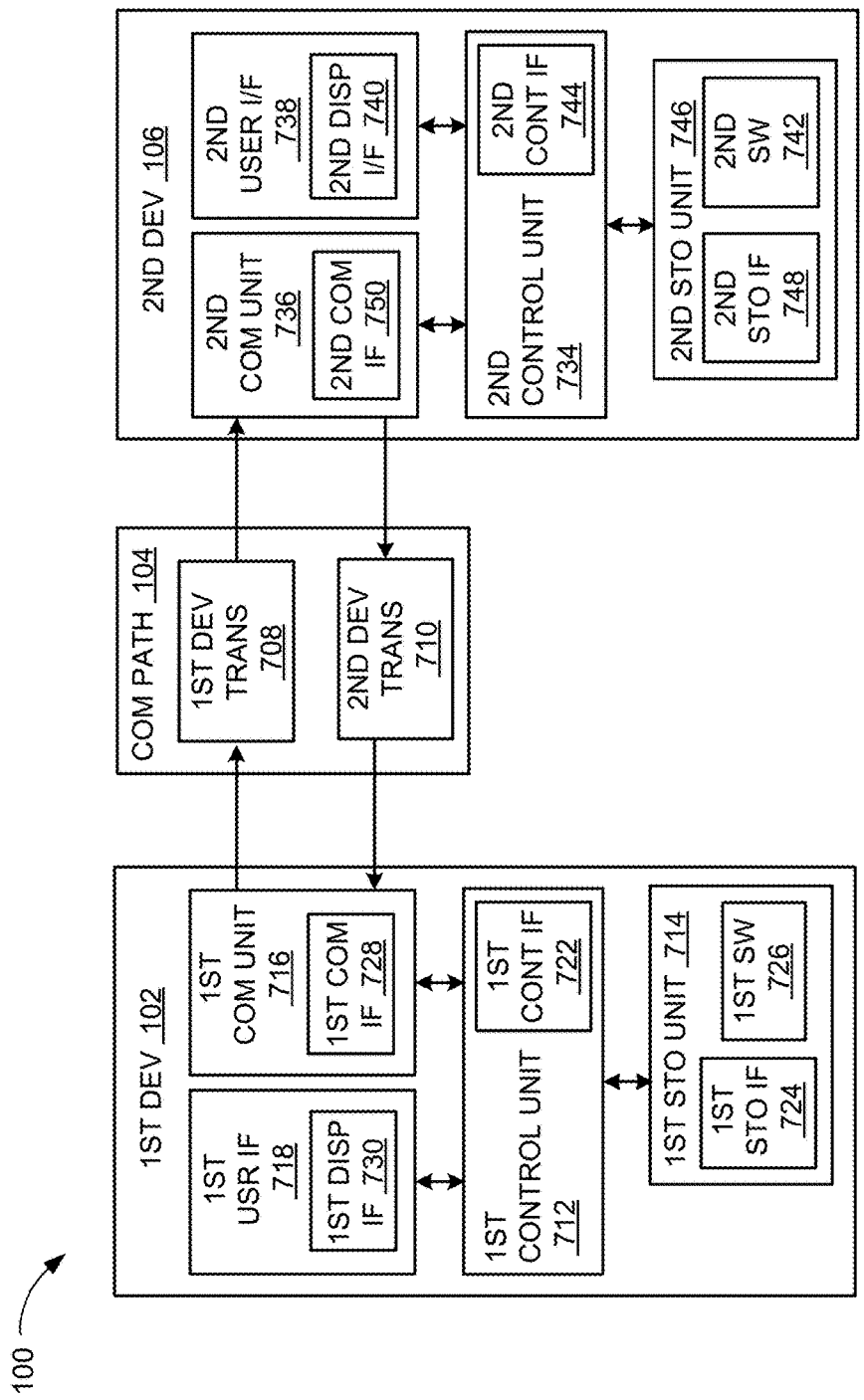
FIG. 7 is an exemplary block diagram of the electronic system.

Referring now to FIG. 7, therein is shown an exemplary block diagram of the electronic system 100. The electronic system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the electronic system 100 is shown with the first device 102 as a client device, although it is understood that the electronic system 100 can include the first device 102 as a different type of device. For example, the first device 102 can be a server including a display interface.

Also for illustrative purposes, the electronic system 100 is shown with the second device 106 as a server, although it is understood that the electronic system 100 can include the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 712, a first storage unit 714, a first communication unit 716, and a first user interface 718. The first control unit 712 can include a first control interface 722. The first control unit 712 can execute a first software 726 to provide the intelligence of the electronic system 100.

The first control unit 712 can be implemented in a number of different manners. For example, the first control unit 712 can be a processor, an application specific integrated circuit (ASIC) an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The first storage unit 714 can store the first software 726. The first storage unit 714 can also store the relevant information, such as data representing incoming images, data representing previously presented image, sound files, or a combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, an infrared sensor for receiving remote signals, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the electronic system 100. The first control unit 712 can also execute the first software 726 for the other functions of the electronic system 100. The first control unit 712 can further execute the first software 726 for interaction with the communication path 104 via the first communication unit 716.

The second device 106 can be optimized for implementing an embodiment of the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the electronic system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the electronic system 100, including operating the second communication unit 736 to communicate with the first device 102 over the communication path 104.

The second control unit 734 can be implemented in a number of different manners. For example, the second control unit 734 can be a processor, an embedded processor, a microprocessor, hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the such as data representing incoming images, data representing previously presented image, sound files, or a combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the electronic system 100 is shown with the second storage unit 746 as a single hierarchy storage system, although it is understood that the electronic system 100 can include the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The electronic system 100 can be executed by the first control unit 712, the second control unit 734, or a combination thereof. For illustrative purposes, the second device 106 is shown with the partition including the second user interface 738, the second storage unit 746, the second control unit 734, and the second communication unit 736, although it is understood that the second device 106 can include a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

Figure 8:
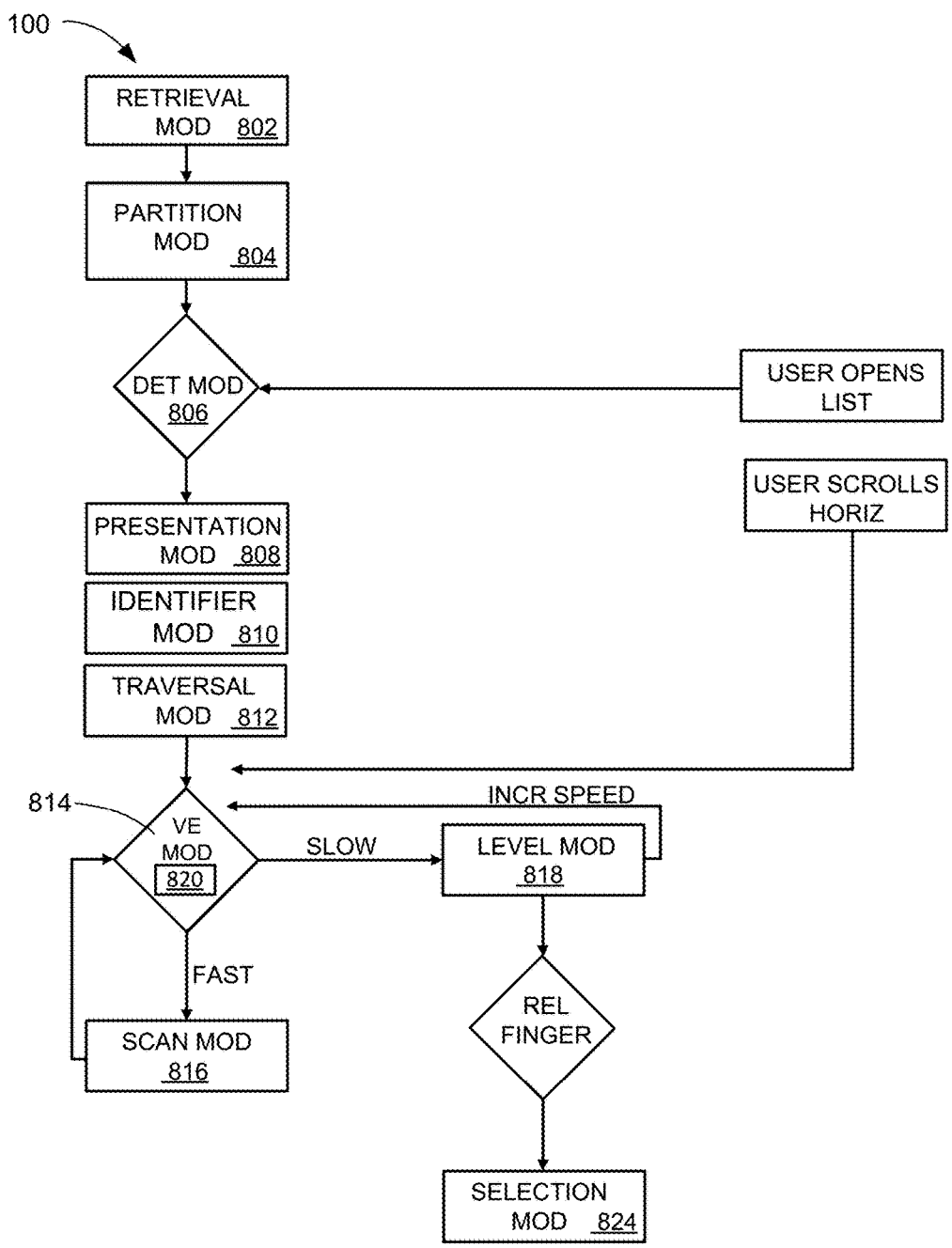
FIG. 8 is a control flow of the electronic system.

Referring now to FIG. 8, therein is shown a control flow of the electronic system 100. The control flow can include a retrieval module 802, a partition module 804, a detection module 806, a presentation module 808, an identifier module 810, a traversal module 812, a velocity module 814, a scan module 816, a level module 818, and a selection module 824.

The retrieval module 802 obtains the information that can be used to generate the graphical navigation interface 202. The retrieval module 802 can obtain the information or content from other module (not shown) or from an external source, such as a database, the second device 106 of FIG. 1, or another instance of the first device 102 of FIG. 1, or a combination thereof. The specifics of the information obtained or retrieved by the retrieval module 802 are further described in later figures. The control flow can progress from the retrieval module 802 to the partition module 804.

The partition module 804 analyzes the information to determine the regions 212 and the markers 208 for the graphical navigation interface 202. The partition module 804 also determines the sub-level 302 and the number of those needed based on the information obtained.

The partition module 804 can analyze the information in a number of ways. For example, the partition module 804 can search for a structure in the information obtained. If the information is organized or configured in a list format or a format that has a hierarchical structure, then the partition module 804 can determine the regions 212, the markers 208, or a combination thereof based on the heading in the list or the top level of the hierarchy 214. The distance between the regions 212, the markers 208, or a combination thereof can be determined by the number of headings or items in the last and distributed evenly along the graphical navigation interface 202. The partition module 804 can generate the spacing of the distribution can include the first spacing 210 of FIG. 2, the second spacing 226 of FIG. 2, the third spacing 502 of FIG. 2, or a combination thereof.

The partition module 804 can also determine the region marker 602 as well as the sub-level marker 604 as well as the sub-level 302 based on the format of the information obtained. As an example, the partition module 804 can determine the order of the regions 212 or the markers 208, or as a more specific example the region marker 602, based on the distance or similarities as described in FIG. 6. The placement of the markers 208, or as a more specific example the region marker 602 and the sub-level marker 604, can be ordered along the graphical navigation interface 202 by the distance or similarities in the matrix shown in FIG. 6.

The process described for the partition module 804 can be repeated or iterated depending on the number of levels in the format of the information obtained. The partition module 804 then arranges the regions 212 and the markers 208 to generate the graphical navigation interface 202 to navigate, invoke, or a combination thereof through the information obtained. The partition module 804 can also select and provide the background 206 for the information relating to the information obtained and the graphical navigation interface 202. The flow can progress from the partition module 804 to the detection module 806.

The detection module 806 determines that the touch gesture 204 has been invoked or detected on the graphical navigation interface 202. The detection module 806 can also determine the location of the initial invocation of the touch gesture 204 along the graphical navigation interface 202. For example, the detection module 806 can identify the specific instance of the regions 212, the markers 208, the sub-level 302, or a combination thereof where the touch gesture 204 is located. The flow can progress from the detection module 806 to the presentation module 808.

The presentation module 808 presents some of the information based on the initial invocation with the touch gesture 204 and its location. The information can be displayed on the upper right corner of the background 206 as depicted and described in FIG. 2. The presentation module 808 can also present some of the content for the specific instance of the regions 212 or the markers 208 where the touch gesture 204 is located. For example, the presentation module 808 can play an audio sample or a video clip if the graphical navigation interface 202 is for a music player or a multimedia player, respectively. The flow can progress from the presentation module 808 to the identifier module 810.

The identifier module 810 presents the identifying information 220 of FIG. 2 at the background 206 in an area within the perimeter of the graphical navigation interface 202. The identifying information 220 can related to the specific instance of the regions 212, the markers 208, or the sub-level 302 where the touch gesture 204 is located. The flow can progress from the identifier module 810 to the traversal module 812.

The traversal module 812 detects movement of the touch gesture 204 along the graphical navigation interface 202. The traversal module 812 can provide haptic feedback, auditory feedback, visual feedback, or a combination thereof. Each of these feedback can be based on the touch gesture 204 being located on or traversing over the region marker 602, the sub-level marker 604, or a combination thereof. While the touch gesture 204 is traversing the graphical navigation interface 202, the identifying information 220 can also be updated based on the location of the touch gesture 204 along the graphical navigation interface 202. The flow can progress from the traversal module 812 to the velocity module 814.

The velocity module 814 determines if the speed of the touch gesture 204 along the graphical navigation interface 202 is within or outside the hierarchy range 224 of FIG. 2. If the speed is within the hierarchy range 224, such as the scanning speed of FIG. 2, as described in FIG. 2, then the flow can progress from the velocity module 814 to a scan module 816. If the speed is outside the hierarchy range 224, then the flow can progress to a level module 818.

The velocity module 814 also determines if there is a change of direction of the movement of the touch gesture 204 along the graphical navigation interface 202. For example, the touch gesture 204 can be moved in a clockwise direction and reversed to the counterclockwise direction or vice versa. When a change of direction is detected, the graphical navigation interface 202 should not invoke a change in level or hierarchy.

There are a number ways of detecting the change in direction of the touch gesture 204 without changing the level of content or information or application. For example, the determination that movement speed of the touch gesture 204 is outside the hierarchy range 224 can be filtered by a minimum time period 820. The minimum time period 820 is used to filter out the speed changes of the touch gesture 204 being outside the hierarchy range 224 if not outside beyond a minimum duration. The minimum time period 820 allows for momentarily and advertent change in speed as well as to accommodate for the change of direction. If the change in speed is not least for the minimum time period 820, then the change in level or hierarchy in the information received is not invoked.

A value for the minimum time period 820 can be set based on a number for factors. For example, the value can be set based on the user's preference for a fast response time, in which case the value will be set very low. Also, if the user does not change direction but simply continues only along one direction, the value can be set low or even to zero. Also for example, if the graphical user interface 230 depicts only the region marker 602 and not the sub-level marker 604, then minimum time period 820 can set low to allow for faster time. If the spacing, e.g. the first spacing 210 of FIG. 2, the second spacing 226 of FIG. 2, the third spacing 502 of FIG. 5 is dense or include a smaller gap size, then the minimum time period 820 can be set low or high depending on the length of reaching the desired content or the response time.

The scan module 816 provides a view of the content, information, application, or a combination thereof for a particular hierarchy of the information obtained. The scan module 816 continues to monitor the speed of the touch gesture 204 along the graphical navigation interface 202. While the speed is at the scanning speed 218, then the content or information relating to the regions 212 and the markers 208 can be displayed as described in FIG. 2. If the scan module 816 detects a speed change in the touch gesture 204 along the graphical navigation interface 202, the flow can progress from the scan module 816 back to the velocity module 814 to determine the appropriate action.

The level module 818 modifies the graphical navigation interface 202 reflecting the transition of hierarchy of the information obtained from one level to another level. The level may be to go from one level to the sub-level 302 or from the sub-level 302 to a higher level. The transition to the sub-level 302 or generally speaking to a lower level is when the speed of the touch gesture 204 is slower and below the lower value of the hierarchy range 224. The transition from the sub-level 302 or generally speaking to a higher level is when the speed of the touch gesture increases and is above the higher value of the hierarchy range 224.

Similar to the scan module 816, the level module 818 can also monitor the speed of the touch gesture 204 along the graphical navigation interface 202. If the level module 818 detects a speed change in the touch gesture 204 along the graphical navigation interface 202, the flow can progress from the level module 818 back to the velocity module 814 to determine the appropriate action. A change in direction in the movement of the touch gesture 204 along the graphical navigation interface 202 can also include the flow transition to the velocity module 814. If the touch gesture 204 stops, then the content, information, application, or a combination thereof relating to the specific instance of the markers 208, the region marker 602, or the sub-level marker 604 can be invoked when the touch gesture 204 is released from that stopped position. The flow can progress from the level module 818 to the selection module 824.

The selection module 824 can invoke the content, information, application, or a combination thereof based on the location of the touch gesture 204 on the graphical navigation interface 202 prior to being released. The selection module 824 can modify the background 206 to match the identifying information 220 as described and depicted in FIG. 2. The selection module 824 can depict the graphical navigation interface 202 as generated by the presentation module 808. The selection module 824 can also maintain the graphical navigation interface 202 for the sub-level 302 where the content was invoked. More details regarding the selection module 824 is further described in FIG. 10.

The flow can progress from the selection module 824 to other modules. For example, the flow can progress to the retrieval module 802 to obtain additional information about the selected item or new information about a different but perhaps related items. The flow can progress to the detection module 806 to detect the next invocation of the touch gesture 204.

It has been discovered that the electronic system 100 provides a graphical navigation interface for interacting user interface elements in an application design for a phone, tablet, computer, notebook, television, or home appliance. The building blocks of user interface structure include of either list or grids structures offering a consistent and predictable pattern to locate a given item in a list array. An example is an address book, where a list is used to store an array of contact names in A-Z order. The lists can also include multiple levels of organization or multiple hierarchies. In the example of the address book, there can be one level of the list elements; all the names in A-Z order. Other lists can be structured in categories, such as for music. Any given song can be structured within an album or artist, then within a given genre, as an example. The graphical navigation interface addresses both the multi-level structure of nested lists as well as provides an easier way to traverse a long list of elements in an array.

It has been discovered that the electronic system 100 provides a user interface control on a touch screen device that enables the user to use one continuous gesture to navigate a long list of items, and to navigate to sub levels of a hierarchy with the same gesture. The term continuous refers to one continuous contact before the contact is released.

It has been discovered that the electronic system 100 provides a looped or circular user interface that will navigate or zoom down to the second level or lower level list when the user scrolls slower in the list and move up in the hierarchy to the parent list when the user scrolls faster in the list.

It has been discovered that the electronic system 100 provides a small thumbnail of artwork or an identifying information for visual recognition and vibration for haptic feedback to indicate the position in the list along with an audio/media sampled at the rate of the velocity or movement of the finger on the user interface control.

It has been discovered that the electronic system 100 provides a looped or circular user interface that is displayed, whereby the user traces the finger along the arc in a continuous motion to move up and down an array of list items. The list will move in the direction of the user's gesture—clockwise to move down the list, counterclockwise to move up the list or reverse view of current hierarchy. As the items in the list move up an audio sample is played to indicate position in the list, along with a small thumbnail of artwork, e.g. the identifying information, for visual recognition and vibration for haptic feedback. The sample rate of the audio clip is based on the velocity or movement of the finger on the user interface control. When the user scrolls slower in the list, the list will navigate or zoom down to the second level list. Once in a second level list, scrolling fast again will move up in the hierarchy to the parent list, as an example. The movement or zooming from one list level to another is indicated by a visual cue.

The electronic system 100 has been described with module functions or order as an example. The electronic system 100 can partition the modules differently or order the modules differently. For example, the change in direction detected in the velocity module 814 can include the flow progress to the level module 818 to move up the hierarchy as opposed to stay in the same hierarchy.

Figure 9:
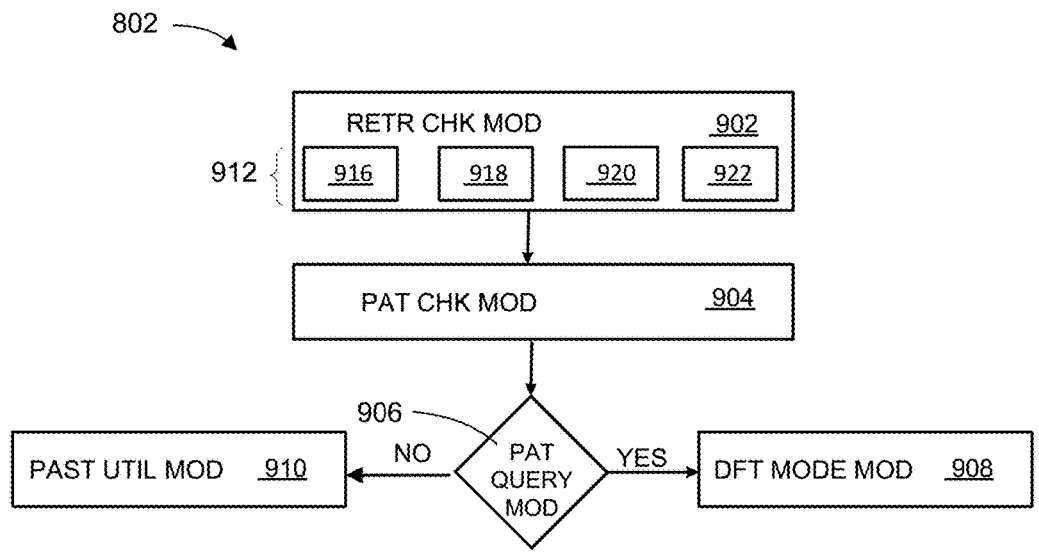
FIG. 9 is a control flow of the retrieval module.

Referring now to FIG. 9, therein is shown a control flow of the retrieval module 802. The retrieval module 802 can include a retrieval check module 902, a pattern check module 904, a pattern query module 906, a default mode module 908, and a past utilization module 910.

The retrieval check module 902 determines which information to retrieve based on factors 912. The factors 912 are used to help establish a context of when the graphical navigation interface 202 is being invoked or being used. The context helps identify similar situations to aid in selecting the appropriate information when the graphical navigation interface 202 is being invoked. The factors 912 can include a retrieval time 916, a retrieval day 918, a retrieval motion 920, and a retrieval location 922.

The retrieval time 916 represents a timing associated with when the graphical navigation interface 202 is invoked or being used. The timing can be a time of day with hours, minutes, seconds, or a combination thereof. The timing can also be contextual windows within a day, such as working hours, off-hours, commute time, school time, study time, or break time.

The retrieval day 918 represents a daily identification associated with when the graphical navigation interface 202 is invoked or being used. The retrieval day 918 can be specific days of the week, such as Sunday, Monday, Tuesday, etc. The retrieval day 918 can represent a classification of the day, such as a holiday, a weekday, a weekend day, a sick day, a vacation day, a school day, etc.

The retrieval motion 920 provides physical information about the device when the graphical navigation interface 202 is being invoked or being used. As examples, the retrieval motion 920 can represent the motion, position, orientation, or a combination thereof for the first device 102 of FIG. 1 or the second device 106 of FIG. 1. The retrieval motion 920 can include the physical information about the first device 102 or the second device 106 based on sensors, such a gyroscope or accelerometer, within the device itself.

The retrieval location 922 provides information about the physical location where the graphical navigation interface 202 is being invoked or used. The retrieval location 922 can include physical coordinates as those available with global position system (GPS) or cellular triangulation, as examples. The retrieval location 922 can also include context location information, such a workplace, home, business function, ball game, etc., indicating a description for the location, such as an activity or an event, rather than pure physical description of the physical location identification.

The retrieval check module 902 can provide information about the factors 912 to help determine what information or content to extract for the retrieval module 802. For example, the retrieval motion 920 can indicate that the first device 102 is undergoing motion or not very stationary, the retrieval check module 902 can provide the appropriate information for the retrieval motion 920 to reflect what information should be extracted. Details about what is extracted is described in the pattern check module 904 and the pattern query module 906 as well as other modules that follow.

As a further example, the retrieval time 916, the retrieval day 918, and the retrieval location 922 can provide fuller information regarding the context of when the graphical navigation interface 202 is invoked. The combination of these particular factors can indicate not only work hours or off hours, work day or weekends, or work location or at home but also can indicate finer granularities than each of the factors 912 alone. The retrieval day 918 can indicate a weekend but the retrieval location 922 can be at work while the retrieval time 916 can be waking hours. This particular combination can indicate the person is at work and the graphical navigation interface 202 can be for information or content for those particular circumstances.

The pattern check module 904 provides storage of past values of the factors 912 and the information or content selected or shown associated with those factors 912. If certain values for the factors 912 have been invoked or learned, the information or content are also stored in, for example, the first storage unit 714 of FIG. 7, the second storage unit 746 of FIG. 7, or a combination thereof.

The pattern query module 906 determines if there is a match for the factors 912 of when the graphical navigation interface 202 is invoked and what is stored in the pattern check module 904. If there is a match, then the flow can progress to the past utilization module 910. If there is no match, then the flow can progress to the default mode module 908.

The past utilization module 910 provides the information or content for the graphical navigation interface 202 that was previously stored as values for the factors 912 matching in the pattern check module 904. As an example continuing with the retrieval motion 920 described earlier, the pattern check module 904 can provide information so only the region marker 602 of FIG. 6 can be shown and not the sub-level marker 604 of FIG. 6 to avoid the added granularities that can be difficult to control with the first device 102 shaking heavily.

The default mode module 908 provides the information or content for the graphical navigation interface 202 when the factors 912 do not exactly match those found by the pattern check module 904. The default mode module 908 can present a default set of information or content based on personal preferences or when the graphical navigation interface 202 was last used. The default mode module 908 can present information or content from the pattern check module 904 that closely matches the factors 912 at the time when the graphical navigation interface 202 is invoked. The factors 912 can still modify how items are presented, such as a shaking environment as described earlier.

Figure 10:
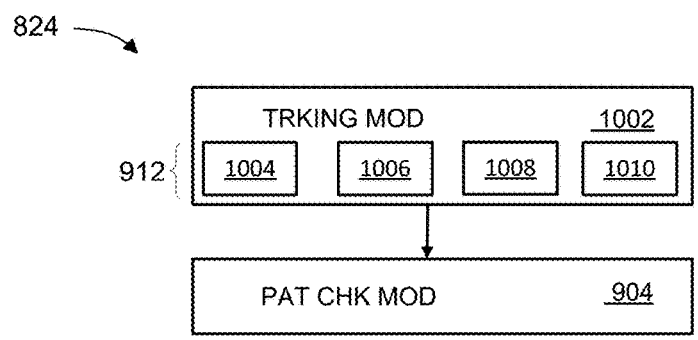
FIG. 10 is a control flow of the selection module.

Referring now to FIG. 10, therein is shown a control flow of the selection module 824. The selection module 824 can include a tracking module 1002 and interact with the pattern check module 904.

The tracking module 1002 records the factors 912 during the utilization of the graphical navigation interface 202 of FIG. 2. The factors 912 can include a utilization time 1004, a utilization day 1006, a utilization motion 1008, and a utilization location 1010.

The utilization time 1004 represents a timing associated with when the graphical navigation interface 202 is being used. The timing can be a time of day with hours, minutes, seconds, or a combination thereof. The timing can also be contextual windows within a day, such as working hours, off-hours, commute time, school time, study time, or break time.

The utilization day 1006 represents a daily identification associated with when the graphical navigation interface 202 is being used. The utilization day 1006 can be specific days of the week, such as Sunday, Monday, Tuesday, etc. The utilization day 1006 can represent a classification of the day, such as a holiday, a weekday, a weekend day, a sick day, a vacation day, a school day, etc.

The utilization motion 1008 provides physical information about the device when the graphical navigation interface 202 is being used. As examples, the utilization motion 1008 can represent the motion, position, orientation, or a combination thereof for the first device 102 of FIG. 1 or the second device 106 of FIG. 1. The utilization motion 1008 can include the physical information about the first device 102 or the second device 106 based on sensors, such as a gyroscope or accelerometer, within the device itself.

The utilization location 1010 provides information about the physical location where the graphical navigation interface 202 is being used. The utilization location 1010 can include physical coordinates as those available with global position system (GPS) or cellular triangulation, as examples. The utilization location 1010 can also include context location information, such a workplace, home, business function, ball game, etc., indicating a description for the location, such as an activity or an event, rather than pure physical description of the physical location identification.

The tracking module 1002 monitors the factors 912 for the selection module 824 and records the values for the utilization time 1004, the utilization day 1006, the utilization motion 1008, and the utilization location 1010 as a user interacts with the graphical navigation interface 202. As a more specific example, the tracking module 1002 can store the factors 912 as a selection is made with the graphical navigation interface 202.

The tracking module 1002 can also record the state of the graphical navigation interface 202 and the information or content shown, for example, with the pattern check module 904. The retrieval module 802 works to compare the retrieval time 916 of FIG. 9, the retrieval day 918 of FIG. 9, the retrieval motion 920 of FIG. 9, and the retrieval location 922 of FIG. 9 with the utilization time 1004, the utilization day 1006, the utilization motion 1008, and the utilization location 1010, respectively, as described in FIG. 9.

The modules described in this application can be hardware implementation or hardware accelerators in the first control unit 712 of FIG. 7 or in the second control unit 734 of FIG. 7. The modules can also be hardware implementation or hardware accelerators within the first device 102 or the second device 106 but outside of the first control unit 712 or the second control unit 734, respectively, as depicted in FIG. 7. However, it is understood that the first control unit 712, the second control unit 734, or a combination thereof can collectively refer to all hardware accelerators for the modules.

The modules described in this application can be implemented as instructions stored on a non-transitory computer readable medium to be executed by a first control unit 712, the second control unit 734, or a combination thereof. The non-transitory computer medium can include the first storage unit 714 of FIG. 7, the second storage unit 746 of FIG. 7, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

In an embodiment of the present invention, a method of operation of an electronic system includes: generating with a control unit a graphical navigation interface including a marker in a loop configuration; detecting a touch gesture on the marker; and presenting identifying information associated with the touch gesture.

Figure 11:
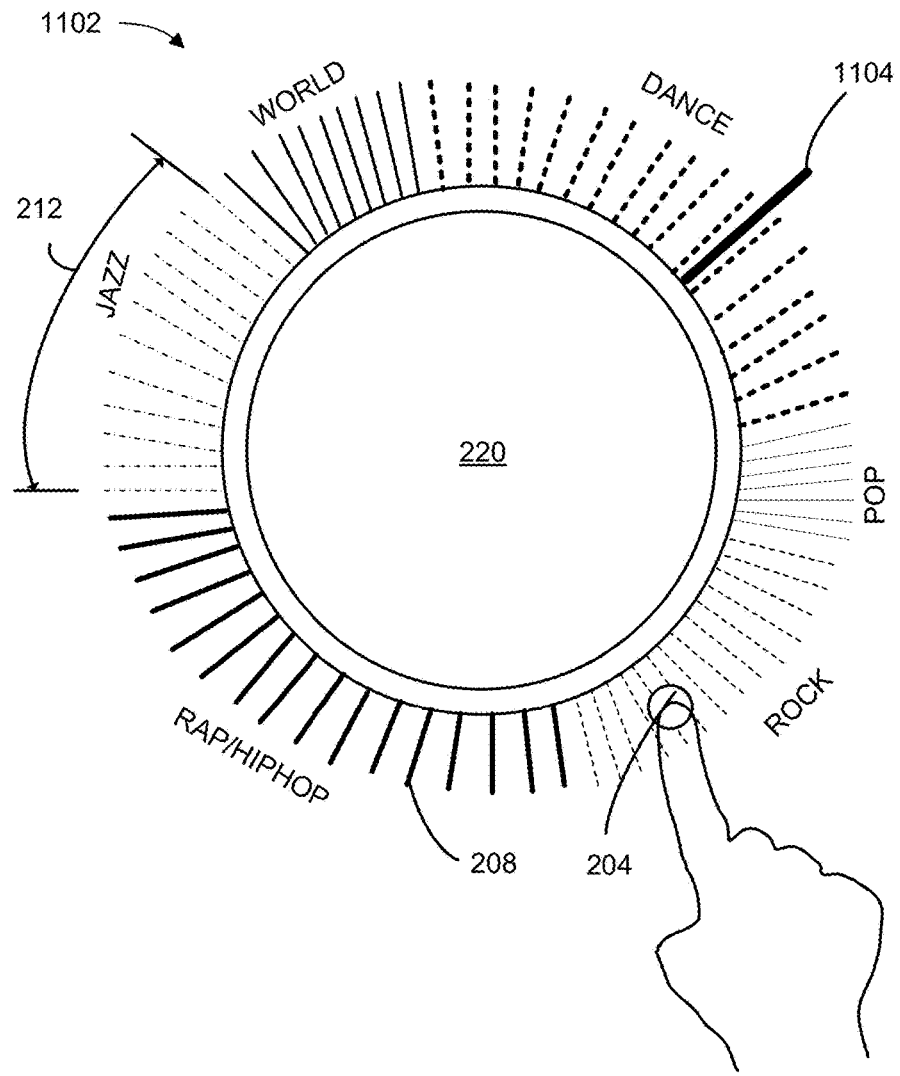
FIG. 11 is an example of a graphical navigation interface in a further embodiment of the present invention.

Referring now to FIG. 11, therein is shown an example of a graphical navigation interface 1102 in a further embodiment of the present invention. The graphical navigation interface 1102 can operate in a similar environment with the electronic system 100 as the graphical navigation interface 202 of FIG. 2.

As an example, this embodiment pertains to the user interface of streaming radio services on mobile devices or generally the first device 102 of FIG. 1. Any embodiment addresses the user interface that enables better discover of music within a streaming service.

In this example for streaming radio service, the graphical navigation interface 1102 addresses the problem of music discovery in streaming services. Embodiments of the present invention enables a multi-sensory method of content or information (e.g. music) discovery, first by enabling the user to select channels through audible means, second via visual cues (album art, title, artist name), third by physical stimulation (haptics or vibrations of the phone), or a combination thereof as previously discussed. These combined form a new method of scanning and finding compelling music to play.

It has been discovered that the embodiments enable the user to scan a wide variety of content or information (e.g. music stations) and sample each via an audible queue. The graphical navigation interface 1102 scales to n-levels of the regions 212, as music stations in this example. In this example, virtually unlimited number of stations can be accommodated in the graphical navigation interface 1102. The graphical navigation interface 1102 can be used without the user actually looking at the first device 102. The graphical navigation interface 1102 can be optimized around a repeatable circular shape (generally a shape in a loop configuration) and feedback can be provided audibly, physically, or a combination thereof.

A set of radio stations, represented by each of the regions 212, can be presented in the graphical navigation interface 1102 in a circular user interface. Each station or one of the markers 208 can be represented in a set of groups or genres. For example, a set of streaming radio stations can be categorized by genre—Rock, Pop, Classical, by characteristic—new releases, up-tempo, sad or any classification determined by a human editor. In the spotlight, as a suggestion, individual stations or each of the markers 208 can be related or categorized under one of these higher level groupings or the hierarchy 214 of FIG. 2. There can be virtually no limit to the number of stations that appear under a category or within the full collection of all categories represented with the regions 212. As an example, the graphical navigation interface 1102 can accommodate 20 stations or 20,000 stations.

Distribution of the stations or the markers 208 within the categories, represented by the regions 212, can be non-uniformly distributed. For example, Pop can have 100 stations while Classical can have 5. The graphical navigation interface 1102 can accommodates uneven distributions.

The graphical navigation interface 1102 can include a selector indicator 1104. The selector indicator 1104 can represent a "playhead" denotes the position of the category represented by the regions 212 and position of the current station represented by one of the markers 208. For example, in a menu for 10 genres, 20 stations per genre, the selector indicator 1104 can indicate the exact position in the array. The selector indicator 1104 would change position depending on the station position—Genre 2, Station 16.

The touch gesture 204 around the graphical navigation interface 1102 using a 1:1 gesture to change positions. One rotation of the ring as outlined by the markers 208 can move the selector indicator 1104 a fixed number of steps or stations. The number of steps can be determined by the desired "coarseness" of the graphical navigation interface 1102. For example, there can be optimally 20-35 markers 208 or stations around one revolution of the graphical navigation interface 1102. Since station numbers can vary within music groupings, the speed the markers 208 traverse pass the selector indicator 1104 is variable. If a music category has more channels, the selector indicator 1104 can move slower than a grouping with fewer channels.

The selector indicator 1104 can automatically move to the next category of channels or the next instance of the regions 212 once the upper or lower boundary of channels has been exceeded when scrolling. For example, if the user scrolls beyond the boundaries of Pop, the selector indicator 1104 will move to the next station grouping, Rock.

For illustrative purposes, the operation of the graphical navigation interface 1102 is described with the touch gesture 204 is along the regions 212 and the markers 208 and not on the selection indicator 1104 although the location of the selection indicator 1104 is used to select the content or information. It is understood that the graphical navigation interface 1102 can operate differently. The touch gesture 204 can be placed on and to move the selection indicator 1104 across the regions 212 and the markers 208 to avoid impeding the view of the regions 212 and the markers 208. In this example, the selection indicator 1104 functions as an adjustable marker.

The user is given audio feedback on stations represented by the markers 208 as the graphical navigation interface 1102 is rotated. An embodiment of the present invention enables the discovery of music based sound. As an example, the music application pre-caches samples of each radio station in the background so that when the user interacts with the dial there is immediate audio feedback, similar to dialing an analog car radio. Once the desired song is heard, the user releases to play.

Stations and genres can be distributed adjacently according to "likeness" in sound, as an example described in FIG. 6. As a further example, the regions 212 and the markers 208 can be distributed along the graphical navigation interface 1102 based on the partition module 804 of FIG. 8. In an example with music categorization, genres are listed in alphabetical order. In an audible scanning scenario, where the user is scrubbing through various channels represented by the regions 212, alphabetical order is not the optimal sort order. Both human and algorithmic logic is used to determine categories of station that sound most alike. For example, Dance, Pop, Rock, and Hard Rock are a more even distribution of music where one genre evenly leads into the other.

The graphical navigation interface 1102 can provide visual feedback as the touch gesture 204 rotates through the clicks or stations of the dial of the graphical navigation interface 1102. In the center of the dial, a visual reference as represented by the identifying information 220 of the album cover is shown along with the station identification, artist name and song name at the top of the screen. This is similar to the description for the graphical navigation interface 202 as described in FIG. 2 and can be performed with the presentation module 808 of FIG. 8, the traversal module 812 of FIG. 8, or a combination thereof, as examples.

The graphical navigation interface 1102 can give physical feedback as the user dials through both the genres represented by the regions 212 and the individual stations represented by the markers 208. This is similar to the description for the graphical navigation interface 202 as described in FIG. 2 and can be performed with the presentation module 808 of FIG. 8, the traversal module 812 of FIG. 8, or a combination thereof, as examples. To indicate clicks through stations of the same genre, a light click is given. When the user crosses one genre into another, a slightly more pronounce click is given, indicating a notch.

On release, the station automatically plays the station where the selection indicator 1104 is located. Once playback starts, the graphical navigation interface 1102 can automatically hide to show album artwork of the playing station. If the attempts to touch the screen, the graphical navigation interface 1102 can detect the presence of the finger and automatically displays the user interface and can be performed with the detection module 806 of FIG. 8 as an example.

Operation of the graphical navigation interface 1102 can be described in FIGS. 2-10 as for the graphical navigation interface 202. Further, the retrieval module 802 of FIG. 8 and FIG. 9 can place the selection indicator 1104 relative to the regions 212 and the markers 208 based on the context and the factors 912 of FIG. 9 for determining the context as described in FIG. 9. Similarly as the touch gesture 204 interacts with the graphical navigation interface 1102, the selection module 824 of FIG. 8 and FIG. 9 can also note the location of the selection indicator 1104 relative to the regions 212 and the markers 208 also based on the context and the factors 912 for establishing context as described in FIG. 8, FIG. 9, and FIG. 10.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a display including a touch screen; and
a processor configured to:
display, on the display, a graphical navigation interface including markers, wherein:
the markers are spaced apart at a first spacing and placed at a plurality of regions in a loop configuration; and
each of the plurality of regions represents a different content, information, classification, application, or a combination thereof in a hierarchy;
detect a touch gesture traversing the graphical navigation interface at a gesture speed,
based on the gesture speed being within a hierarchy range, display information about a current level of the hierarchy corresponding to a position of the touch gesture on a marker, wherein the information comprises information about a song name, an artist, an album name, or a musical genre,
based on the gesture speed of the touch gesture falling below a lower value of the hierarchy range, increase the first spacing of the markers to a second spacing, wherein the second spacing presents fine grain control to select the information or control for the region of the loop configuration, and
based on the gesture speed of the touch gesture exceeding a high value of the hierarchy range, present a next highest level of the hierarchy from the current level of the hierarchy.

2. The system as claimed in claim 1, wherein the processor is configured to invoke the graphical navigation interface including a selection indicator along the loop configuration.

3. The system as claimed in claim 1, wherein the control unit processor is configured to:
invoke one region of the plurality of regions representing the hierarchy associated with the graphical navigation interface; and
invoke a sub-level in the hierarchy for the marker.

4. The system as claimed in claim 1, wherein:
the display is configured to display identifying information within a perimeter of the graphical navigation interface; and
displaying the identifying information is based on a previously stored value of one or more of a time of day, a classification of the day, a motion, or a location.

5. The system as claimed in claim 1, wherein
the markers in each region of the plurality of regions are graphically represented differently than the markers in an adjacent region.

6. The system as claimed in claim 1, wherein the processor is configured to detect a release of the touch gesture to make a selection for the marker.

7. The system of claim 1, wherein the processor is further configured to display, on the display, identifying information at a background in an area within a perimeter of the graphical navigation interface.

8. The system of claim 7, wherein the processor is further configured to change the identifying information displayed based on the touch gesture being detected on a particular marker in the loop configuration.

9. A method of operation of an electronic system comprising:
displaying, on a display, a graphical navigation interface including markers, wherein:
the markers are spaced apart at a first spacing and placed at a plurality of regions in a loop configuration, and
each of the plurality of regions represents a different content, information, classification, application, or a combination thereof in a hierarchy,
detecting a touch gesture traversing the graphical navigation interface at a gesture speed;
based on the gesture speed being within a hierarchy range, displaying information about a current level of the hierarchy corresponding to a position of the touch gesture on a marker, wherein the information comprises information about a song name, an artist, an album name, or a musical genre;
based on the gesture speed of the touch gesture falling below a lower value of the hierarchy range, increasing the first spacing of the markers to a second spacing, wherein the second spacing presents fine grain control to select the information or control for the region of the loop configuration; and
based on the gesture speed of the touch gesture exceeding a high value of the hierarchy range, presenting a next highest level of the hierarchy from the current level of the hierarchy.

10. The method as claimed in claim 9, further comprising invoking a selection indicator along the loop configuration.

11. The method as claimed in claim 9, further comprising:
invoking one region of the plurality of regions representing the hierarchy associated with the graphical navigation interface; and
invoking a sub-level in the hierarchy for the marker.

12. The method as claimed in claim 9, further comprising displaying identifying information within a perimeter of the graphical navigation interface, wherein displaying the identifying information is based on a previously stored value of one or more of a time of day, a classification of the day, a motion, or a location.

13. The method as claimed in claim 9 wherein:
the markers in each region of the plurality of regions are graphically represented differently than the markers in an adjacent region.

14. The method as claimed in claim 9, further comprising detecting a release of the touch gesture to make a selection for the marker.

15. The method of claim 9, further comprising displaying identifying information at a background in an area within a perimeter of the graphical navigation interface.

16. The method of claim 15, further comprising changing the identifying information displayed based on the touch gesture being detected on a particular marker in the loop configuration.

17. A non-transitory computer readable medium storing instructions for operation of an electronic system that, when executed by a processor, cause the processor to:
display, on a display, a graphical navigation interface including markers, wherein:
the markers are spaced apart at a first spacing and placed at a plurality of regions in a loop configuration, and
each of the plurality of regions represents a different content, information, classification, application, or a combination thereof in a hierarchy,
detect a touch gesture traversing the graphical navigation interface at a gesture speed;
based on the gesture speed being within a hierarchy range, display information about a current level of the hierarchy corresponding to a position of the touch gesture on a marker, wherein the information comprises information about a song name, an artist, an album name, or a musical genre;
based on the gesture speed of the touch gesture falling below a lower value of the hierarchy range, increase the first spacing of the markers to a second spacing, wherein the second spacing presents fine grain control to select the information or control for the region of the loop configuration; and
based on the gesture speed of the touch gesture exceeding a high value of the hierarchy range, present a next highest level of the hierarchy from the current level of the hierarchy.

18. The non-transitory computer readable medium as claimed in claim 17, wherein the medium further stores instructions that, when executed by the processor, causes the processor to invoke the graphical navigation interface including a selection indicator along the loop configuration.

19. The non-transitory computer readable medium as claimed in claim 17, wherein: the markers in each region of the plurality of regions are graphically represented differently than the markers in an adjacent region.

20. The non-transitory computer readable medium of claim 17, further comprising instructions that, when executed by the processor, cause the processor to display identifying information at a background in an area within a perimeter of the graphical navigation interface.

21. The non-transitory computer readable medium of claim 20, further comprising instructions that, when executed by the processor, cause the processor to change the identifying information displayed based on the touch gesture being detected on a particular marker in the loop configuration.

* * * * *